Figure 1:
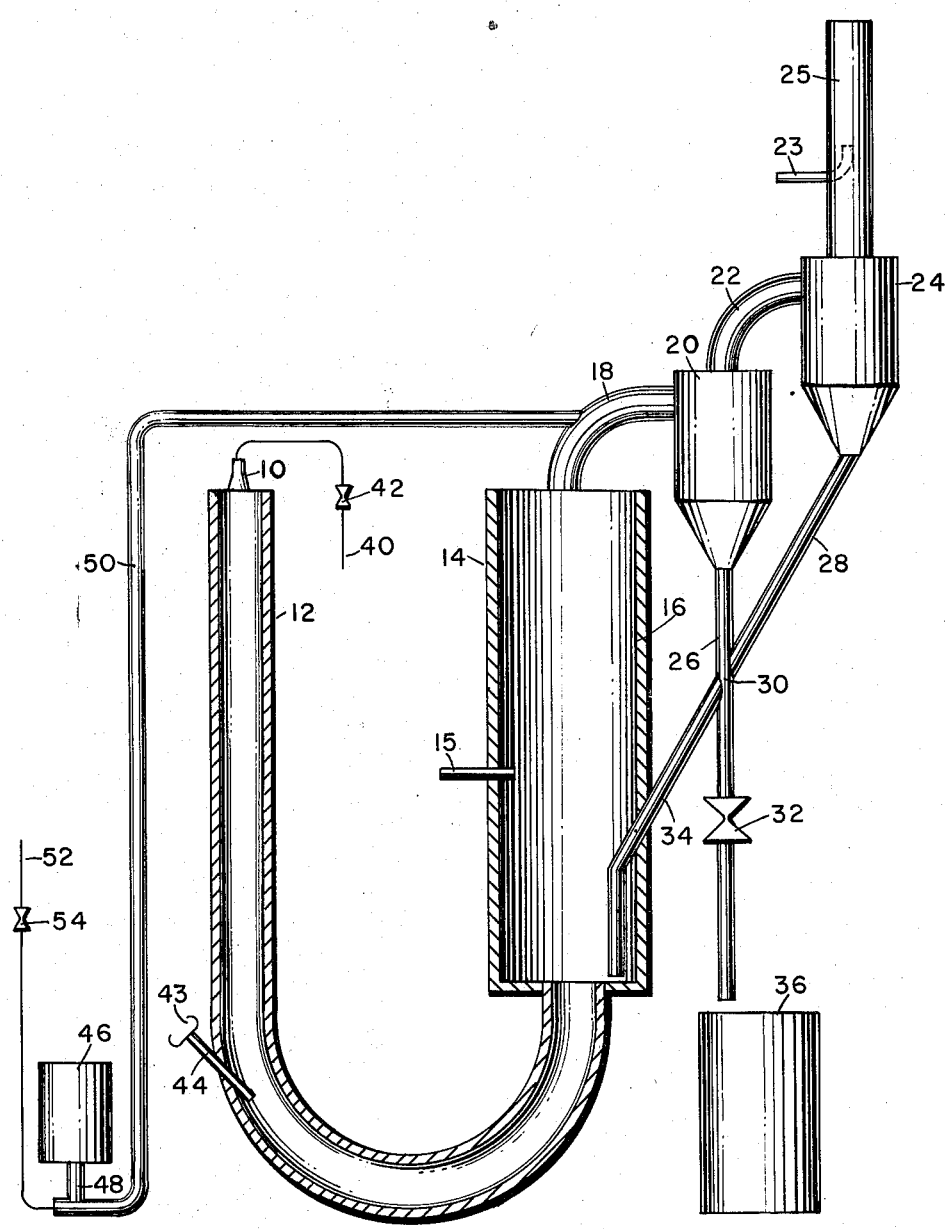

Oct. 25, 1960     H. S. WEINER     2,957,922
CHLORINATION OF ETHYLENE DICHLORIDE
Filed Sept. 28, 1956     2 Sheets-Sheet 1

INVENTOR
HARRY S. WEINER
BY *CT Cross*
ATTORNEY

Oct. 25, 1960 H. S. WEINER 2,957,922
CHLORINATION OF ETHYLENE DICHLORIDE
Filed Sept. 28. 1956 2 Sheets-Sheet 2

INVENTOR
HARRY S. WEINER
BY
ATTORNEY 2,957,922
CHLORINATION OF ETHYLENE DICHLORIDE

Harry S. Weiner, Houston, Tex., assignor to Diamond Alkali Company, Cleveland, Ohio, a corporation of Ohio Filed Sept. 28, 1956, Ser. No. 612,624

3 Claims. (Cl. 260—654)

This invention relates to improvements in the treatment of finely-divided catalysts as are used in fluidized catalyst bed reactions. More particularly, the invention relates to a new and improved process for flame treatment of such catalyst.

Up to the present time, fluidized catalyst bed reactors utilizing finely-divided catalyst particles have achieved wide application in differing catalytic processes because they permit uniform heat control and promote intimate mixing of the reactants. A notable example of fluidized catalyst utilization has been in the derivation of halo-substituted ethylene derivatives, e.g., chlor-substituted ethylene derivatives, especially tetrachlorethylene (perchlorethylene) which are obtained by introducing a chlorinated ethylene and chlorine into a fluidized catalyst bed reaction zone, effecting the desired reaction, and separating the desired chlor-substituted compound from the reaction mixture.

However, in such reaction, especially in the manufacture of chlor-substituted ethylene derivatives, e.g., tetrachlorethylene, it has been found that serious difficulties have often been encountered with respect to the catalyst particles after the reaction has been under way for some time. For example, it has been discovered that as operation continues a serious increase in the type and extent of undesired side reaction occurs. Moreover, the catalyst bed becomes characterized by poor fluidity. In addition, it is found not only that the product yield is reduced but that its purity is reduced also. These difficulties generally have been attributed to a so-called "degradation" of the catalyst particles, which degradation has heretofore been a significant problem in the operation of fluidized catalyst particle reaction reactors.

Prior art attempts to avoid these difficulties have, of course, included the obvious expedient of emptying the reactor of the catalyst particles and recharging with new catalyst. However, not only is such an expedient costly but also serious operating problems are incurred because only after an initial period of operation using the new catalyst charge does the reaction become stable and is process equilibrium attained.

An alternative expedient heretofore proposed comprises the incremental addition of fresh catalyst and removal of degraded catalyst in an attempt thus to maintain a stable operating condition. However, this procedure involves difficulties also because a sizable amount of new catalyst must be introduced and degraded catalyst removed in this manner before any appreciable benefical effects are noted. By thus introducing a sizeable amount of new catalyst, it is found that many of the difficulties associated with an entire new catalyst particle charge are encountered. Such difficulties include a poor conversion to the desired product, occurrence of undesired side reactions, poor product quality and an undesired equipment pluggage.

Accordingly, it is a principal object of the present invention to avoid the difficulties heretofore encountered in the operation of fluidized catalyst bed reactors to provide a new and improved catalyst treatment.

A further object of the invention is to provide an improved method for the continuous production of halo-substituted ethylene derivatives via a fluidized catalyst reactor whereby a highly efficient continuous treatment of catalyst is achieved.

A still further object of the invention is the provision of a new and improved fluidized catalyst treatment.

Broadly, the present invention involves contacting a finely-divided catalyst with a burner flame in order to improve the catalyst operating characteristics. This treatment may advantageously be applied either to new catalyst or to so-called "degraded" catalyst with highly beneficial effects in either instance.

More specificly, the practice of the present invention involves contacting a finely-divided catalyst with a burner flame, preferably a nautral gas flame operated with an excess of air or oxygen, and subsequently maintaining the flame-contacted, finely-divided catalyst in a fluidized state subject to said flame at an elevated temperature in order to achieve a high degree of uniform heating and fluidity of the catalyst.

Even more specifically, thus, it will be understood that the practice of the present invention involves treating either fresh catalyst, or degraded catalyst, preferably by passing through a burner flame, i.e., flame heated, especially a gas flame burning in the presence of excess air or oxygen. The practice of this invention is advantageous in connection with the production of chlor-substituted ethylene derivatives by reaction of chlorine and an ethylene derivative in a fluidized catalyst bed reactor. An especially advantageous practice of the present invention contemplates operation in conjunction with the process described and claimed in co-pending application Serial No. 571,197 filed March 13, 1956, now abandoned, which process deals with the recycling of so-called "heavy ends" in the production of chlor-substituted compounds.

Catalyst treated in accordance with this invention may be any of the finely-divided catalysts generally found useful in fluidized bed reactors. For example, the catalyst may be one or a mixture of various finely-divided heat resistant, non-halogenatable, inert materials such as sand, silicon carbide, clay, diatomaceous earth, synthetic aluminum silicate, synthetic silica alumina gel, alumina gel, hydrate of natural aluminum-magnesium-silicate known as "fuller's earth" and the like. A type of catalyst which may advantageously be treated in accordance with the present invention comprises a silica-alumina catalyst such as one having a bulk density within the range from about 50 to 100 lbs. per cubic foot and a particle size sufficient to insure proper fluidity under the conditions of the reaction. Typically practicable particle size distributions of such a catalyst are from about 10–20% of 100 mesh, 40–60% of 200 mesh, 10–20% of 325 mesh, and 2–10% finer than 325 mesh. Generally, the surface structure of such a catalyst should be reasonably smooth as constrasted with sharp or irregular surface particles.

Even more specifically, the preferred type of catalyst treated in accordance with the present invention is one comprising a finely-divided material containing a predominant amount of silica ($SiO_2$), a minor amount of alumina ($Al_2O_3$), and, in certain instances, trace amounts of other metals such as copper, sodium, magnesium, calcium, chromium, iron, nickel, vanadium, titanium and manganese. The following table illustrates by typical analysis specific catalysts of this type, the quantities expressed being in terms of percent by weight, unless otherwise indicated.

|  | A | B | C | D | E | F |
|---|---|---|---|---|---|---|
| Bulk Density, lbs./cu. ft. |  |  | 60.2 | 58.5 | 56.9 | 53.2 |
| Silica_____percent__ | 95.5 | 95.7 | 85.9 | 85.7 | 93 |  |
| Alumina_____do____ | 4.2 | 3.7 | 14.0 | 14.0 | 0.6 |  |
| Copper_____do____ |  | 0.004 |  |  | 0.001 |  |
| Sodium_____do____ |  | None |  |  | Less than 0.05 |  |
| Magnesium___do____ |  | 0.004 |  |  | 0.002-0.02 |  |
| Calcium_____do____ |  | 0.0004 |  |  | 0.002-0.02 |  |
| Chromium____do____ |  | 0.0006 |  |  | 0.004 |  |
| Iron as $Fe_2O_3$__do____ | 0.10 | 0.29 | 0.42 | 0.018 | 0.2 |  |
| Nickel_____do____ |  | 0.03 |  |  | 0.006 |  |
| Vanadium____do____ |  | 0.015 |  |  | 0.008 |  |
| Titanium____do____ |  | 0.03 |  |  | 0.004 |  |
| Manganese___do____ |  | None |  |  | 0.004 |  |

In practice, the present invention contemplates treating such a catalyst either in a "new" state or in a "degraded" state after usage in a fluidized bed reactor, particularly after usage in a reactor in which a chlor-substituted ethylene derivative is produced, by passing the catalyst through a natural gas flame such as by feeding the catalyst directly into and through the gas flame from a hopper. The catalyst is then separated from the gas stream by means of a cyclone or other separator and recycled back to the flame until the proper degree of flame treatment has been achieved. In general, it is desired to pass the catalyst through a direct fired chamber maintained at a temperature of about 1100°–1500° F., the maximum practicable temperature being dictated by the temperature at which fusion of the catalyst occurs, e.g., 1700°–1800° F.

After the proper degree of flame treatment is achieved, the catalyst is removed from the system and again charged into the reactor, e.g., incrementally adding the thus-treated catalyst and removing degraded catalyst, or preferably, as a continuous process. In actual commercial operation it has been found that in the production of tetrachlorethylene a marked decrease in undesired byproduct formation is achieved when catalyst treated in accordance with this invention is employed, the catalyst being gradually introduced to the reactor while it is being operated, corresponding amounts of degraded catalyst also being removed.

Figure 2:
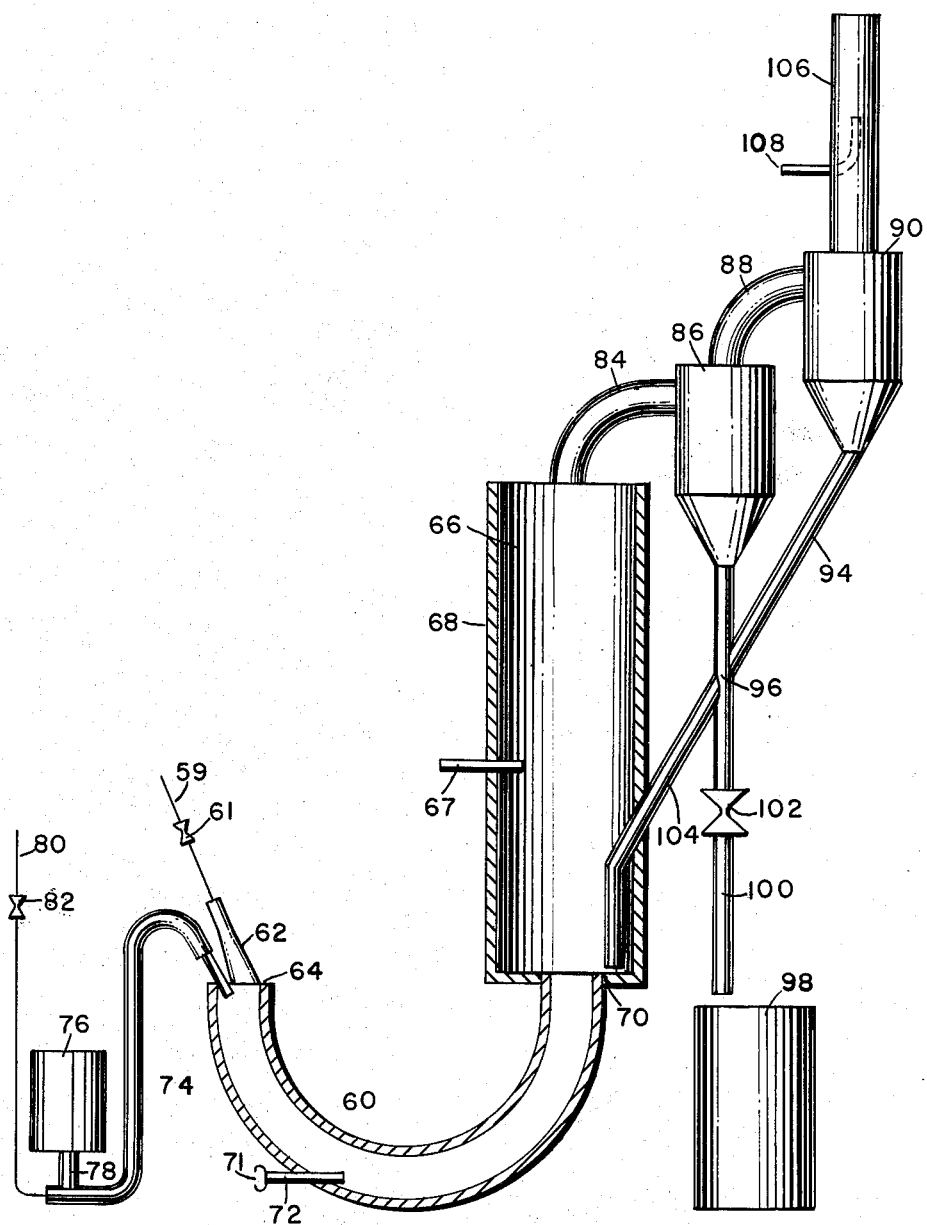

Referring now to the accompanying drawing which illustrates apparatus for treating a catalyst in accordance with this invention:

Fig. 1 is a schematic view of apparatus for treating a catalyst in accordance with this invention; and Fig. 2 is a schematic view of another embodiment of apparatus for treating a catalyst in accordance with this invention.

Referring more particularly to the drawing in Fig. 1, it will be seen that there is provided a gas burner 10 directed downwardly into one arm of a generally U-shaped tubular member indicated generally at 12, the opposite arm of which comprises cylindrical member 14 housing a fluidized catalyst bed 16 and provided with a thermo well 15. At the top of the fluidized catalyst bed 16 is an outlet pipe 18 leading to a cyclone separator 20. From the top of cyclone 20 there extends a pipe 22 leading to a second cyclone 24. From the top of cyclone 24 there extends a discharge stack 25 into which air is injected via pipe 23. From the cyclones 20 and 24, respectively, discharge pipes 26 and 28 extend downwardly and are united at 30 and via valve 32 and pipe 34 may, respectively, be used to pass treated catalyst particles to a catalyst drum 36 or back into the catalyst bed 16.

It will be observed that the burner 10 is supplied with gas via line 40 controlled by valve 42. Air or oxygen to effect combustion is introduced via pipe 44, provided with a slip-on coupling 43, adjacent the curved portion of the U-shaped apparatus 12. Catalyst is introduced into the apparatus by a charge pot 46 which via pipe 48 is connected to a feed line 50 through which air is blown by means of pipe 52 which is controlled by valve 54. Hence, it will be appreciated that air passing through pipe 50 draws finely-divided catalyst particles from the charge pot 46 and introduces them into the apparatus via the cyclone recovery system from whence they are fed into the fluidized catalyst bed and exposed to the action of the burner flame, where they reside for a sufficient time to accomplish the desired flame treatment, e.g., 5 seconds.

Fig. 2 illustrates another, and presently preferred, embodiment of the apparatus in accordance with this invention. This apparatus comprises a U-shaped member indicated generally at 60, a burner 62 directed into one arm 64 of the U-shaped member 60 and a fluidized catalyst bed 66 comprising a refractory-lined cylindrical chamber 68 disposed at the top of the opposite arm 70 of the U-shaped member 60 and provided with a thermo well 67. In operation, air is introduced substantially tangentially and intermediate the ends 64 and 70 via pipe 72 provided with a slip-on coupling 71.

Catalyst and air are introduced adjacent the burner 62 by means of inlet pipe 74. Catalyst is charged from a charge pot 76 in fluid connection with line 74 via pipe 78. Air is supplied to line 74 via line 80 which is controlled by valve 82. Gas is supplied to the burner 62 via line 59 which is controlled by valve 61, the flame-catalyst occurring from the burner 62 into the catalyst bed 66. At the top of the fluidized catalyst bed 66 is provided an outlet pipe 84 leading to a first cyclone separator 86. From the top of the first cyclone separator extends an outlet pipe 88 leading to a second cyclone separator 90.

There is provided at the top of the second separator 90 a discharge stack 106 into which air is introduced via pipe 103. From the bottom of cyclones 86 and 90, respectively, extend discharge pipes 92 and 94 which intersect at 96. From the intersection 96 catalyst may be discharged to a catalyst drum 98 via line 100 controlled by valve 102 or, alternatively, recycled to the fluidized catalyst bed 66 via line 104.

In order that those skilled in the art may more completely understand the present invention and the preferred methods by which the same may be carried into effect, the following specific examples are offered.

*Example 1*

In the production of tetrachlorethylene in a fluidized catalyst bed reactor ethylene dichloride and chlorine are introduced into the reactor at sufficient rates to produce the desired tetrachlorethylene, the reactor being maintained at a temperature between 800° and 820° F. and at a pressure of 1–15 p.s.i.g. gaseous chlorine, the ethylene dichloride being introduced as a liquid in a proportion of about 3 mols of chlorine for each mol of ethylene dichloride. Using a silica-alumina catalyst having a particle size as follows:

| Mesh size: | Percent by weight |
|---|---|
| 50 | 0.2 |
| 100 | 1.0 |
| 140 | 2.7 |
| 200 | 4.9 |
| 270 | 10.7 |
| 325 | 68.1 |
| Pan | 12.4 | it is found in continued operation that the heavy ends in the crude perchlorethylene, i.e., those undesired byproducts having boiling points greater than that of perchlorethylene (249.4° F.) comprise about 12% of the crude product obtained. However, after catalyst treated in accordance with the present invention is introduced for two days with corresponding removal of degraded catalyst, the heavy ends concentration decreases until it approaches 8%.

Example II

Using the procedure of Example I in a perchlorethylene fluid catalyst bed reactor in continuous operation heavy ends are recycled to the reactor into which is introduced an initial charge of fresh catalyst. The heavy ends in the crude perchlorethylene increase only an average of about 2% for approximately 15 days. Then the heavy ends increase sharply to an average of 15%. At this time separate additions of fresh catalyst treated in accordance with the present invention by passing the catalyst through a natural gas flame burning with an excess of oxygen in the apparatus shown in the accompanying drawings, and similarly treated degraded catalyst are added to the reactor for 5 days. As a result of this addition, the heavy ends in the crude perchlorethylene drop to an average of 7%. Five days after the last treated catalyst is added the heavy ends increase to an average of 14%. The reactor is then again charged with both fresh and degraded catalyst treated in accordance with the present invention. After such treated catalyst is incrementally added for 10 days, the heavy ends concentration in the crude perchlorethylene decreased to 6%. This low percentage remains for 10 days and then increases slowly again. These results clearly indicate the advantageous results obtained and specifically demonstrate the improved product purity obtained by treating the catalyst particles in accordance with applicant's invention.

Example III

Using apparatus shown in Fig. 1, catalyst is "deactivated" or "regenerated," depending on whether fresh or degraded catalyst is introduced, by fluidizing it in a hot natural gas flame-air mixture in a brick-lined vessel as shown in the drawing. A charge of 5–10 gallons of catalyst is placed into the system via the charge pot 46. The catalyst drops from the cyclone separators into the fluidized bed 16. The hot gases in the system set up a circulation by means of which the catalyst is lifted to the cyclones and returned to the fluidized bed 16 through the return lines 26, 28, and 34. The gas burner is operated using an excess of air introduced through pipe 44. A catalyst charge is maintained in the fluidized bed 16 for from 40 minutes to 2 hours, the maximum temperature achieved in the bed being 1300° F. The thus-treated catalyst is then ready for use in a fluidized bed reactor.

Example IV

Using the apparatus in the accompanying drawing, the general procedure of Example III is repeated, except that the gas flame travel is considerably shorter and the catalyst is fed continuously, adjacent the burner 62, as shown in Fig. 2. The burner end of the apparatus is sealed so that no gases or catalysts can be blown out the burner end. The highest temperature achieved in this system is 1800° F., the most desirable temperature being found to be about 1650° F.

Analysis of catalysts treated in accordance with this procedure indicates that before treatment, the carbon content is 17.61% and the loss on ignition is 28.64%. After treatment, the carbon content is 6.13% and the loss on ignition is 6.02%.

It is to be understood that although the invention has been described with specific reference to particular embodiments thereof, it is not to be so limited, since changes and alterations therein may be made which are within the full intended scope of this invention as defined by the appended claims.

What is claimed is:

1. In the production of chlor-substituted ethylenes wherein ethylene dichloride and chlorine are combined in a fluidized catalyst bed at an elevated temperature and a reaction therebetween is effected, said catalyst bed being formed of finely-divided catalyst particles selected from the group consisting of sand, silicon carbide, clay, diatomaceous earth, synthetic aluminum silicate, silica-alumina gel, alumina gel, and natural aluminum-magnesium-silicate, said particles being maintained in a fluidized condition in a reaction zone, the improvement which consists of adding to said fluidized catalyst bed, catalyst particles which have been flame-heated to an elevated temperature by direct contact with a burner flame, prior to their introduction into said bed.

2. The method of claim 1 wherein the flame-heating of the catalyst particles is obtained by burning natural gas with an excess of oxygen-containing gas.

3. The method of claim 1 wherein the improvement consists in adding to said catalyst bed particles selected from said group, which particles have been maintained in a fluidized state in contact with a flame obtained by burning natural gas with an excess of an oxygen-containing gas.

References Cited in the file of this patent

UNITED STATES PATENTS

| | | |
|---|---|---|
| 2,325,516 | Holt et al. | July 27, 1943 |
| 2,710,827 | Gornowski | June 14, 1955 |

UNITED STATES PATENT OFFICE

CERTIFICATION OF CORRECTION

Patent No. 2,957,922　　　　　　　　　　　　October 25, 1960

Harry S. Weiner

It is hereby certified that error appears in the above numbered patent requiring correction and that the said Letters Patent should read as corrected below.

In the grant, line 3, and in the heading to the printed specification, line 5, State of incorporation, for "Ohio" read -- Delaware --; column 2, line 59, for "constrasted" read -- contrasted --.

Signed and sealed this 2nd day of May 1961.

(SEAL)
Attest:

ERNEST W. SWIDER
Attesting Officer

DAVID L. LADD
Commissioner of Patents